United States Patent
Childress et al.

(10) Patent No.: US 9,756,057 B2
(45) Date of Patent: Sep. 5, 2017

(54) SYSTEM AND METHOD FOR ENHANCED DISPLAY-SCREEN SECURITY AND PRIVACY

(71) Applicant: INTERNATIONAL BUSINESS MACHINES CORPORATION, Armonk, NY (US)

(72) Inventors: Rhonda L. Childress, Austin, TX (US); Itzhack Goldberg, Hadera (IL); James R. Kozloski, New Fairfield, CT (US); Clifford A. Pickover, Yorktown Heights, NY (US); Neil Sondhi, Budapest (HU); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/744,875

(22) Filed: Jun. 19, 2015

(65) Prior Publication Data
US 2016/0283732 A1    Sep. 29, 2016

Related U.S. Application Data

(63) Continuation of application No. 14/667,294, filed on Mar. 24, 2015.

(51) Int. Cl.
*H04L 29/00* (2006.01)
*H04L 29/06* (2006.01)
(Continued)

(52) U.S. Cl.
CPC .......... *H04L 63/14* (2013.01); *G06F 17/2705* (2013.01); *G06F 21/6218* (2013.01);
(Continued)

(58) Field of Classification Search
CPC ............ G06F 7/00; G06F 21/62; G06F 21/60
USPC ......................................................... 726/30
See application file for complete search history.

(56) References Cited

U.S. PATENT DOCUMENTS

| 6,922,693 B1 | 7/2005 | Rubin et al. |
| 7,966,376 B2 | 6/2011 | Kelso et al. |
| (Continued) | | |

FOREIGN PATENT DOCUMENTS

CN        103246831 A    8/2013

OTHER PUBLICATIONS

Freddy Torres/ Exploiting Audiovisual Attention for Video Coding/ May 2013/pp. 1-84.*

(Continued)

*Primary Examiner* — Brandon Hoffman
*Assistant Examiner* — Michael D Anderson
(74) *Attorney, Agent, or Firm* — Tutunjian & Bitetto PC; Alexa Ashworth

(57) ABSTRACT

A security method that includes assigning a sensitivity value for a communication with a sensitivity determining module including at least one hardware processor. Following assignment of the sensitivity value to the communication, the communication is formatted for display. When sensitivity value exceeds a security threshold, the communication is parsed into a sequence of fragments. The communication is transmitted as the sequence of fragments when said sensitivity value exceeds the security threshold.

3 Claims, 10 Drawing Sheets

(51) Int. Cl.
　　　H04L 12/58　　　　(2006.01)
　　　G06F 17/27　　　　(2006.01)
　　　G06F 21/62　　　　(2013.01)
(52) U.S. Cl.
　　　CPC .......... *H04L 51/046* (2013.01); *H04L 51/063* (2013.01); *H04L 51/10* (2013.01); *H04L 63/04* (2013.01); *H04L 63/0428* (2013.01); *H04L 63/105* (2013.01)

(56) References Cited

U.S. PATENT DOCUMENTS

| | | | |
|---|---|---|---|
| 8,612,854 B2 * | 12/2013 | Eisen | H04N 1/00864 |
| | | | 715/221 |
| 9,069,983 B1 * | 6/2015 | Nijjar | G06F 21/6209 |
| 2010/0259560 A1 | 10/2010 | Jakobson et al. | |
| 2012/0255029 A1 | 10/2012 | Kim et al. | |
| 2013/0103943 A1 | 4/2013 | Hirsch et al. | |
| 2014/0201844 A1 | 7/2014 | Buck | |

OTHER PUBLICATIONS

Anonymous, "Automatic application screen identification based on screen image," IP.com, Jun. 13, 2010. (9 Pages).
Anonymous, "Privacy Protection for Electronic Document Viewing," IP.com, Feb. 16, 2012. (9 Pages).
Hauk, C., "Review: iDelete for iOS—This Text Message Will Self-Destruct in 10 Seconds," MacTrast.com, Mar. 23, 2013. http://www.mactrast. com/2013/03/review-idelete-for-ios-this-text-message-will-self-destruct-in-10-seconds/. (5 Pages).

* cited by examiner

SYSTEM AND METHOD FOR ENHANCED DISPLAY-SCREEN SECURITY AND PRIVACY

CROSS REFERENCE TO RELATED APPLICATIONS

This application is a Continuation application of co-pending U.S. patent application Ser. No. 14/667,294, filed on Mar. 24, 2015, incorporated herein by reference in its entirety.

BACKGROUND

Technical Field

The present disclosure relates to security and privacy, and more in some embodiments to providing secure methods and systems for transmitting messages.

Description of the Related Art

As computer screens are becoming larger, brighter and sharper, they are generally easier to read from a greater distance and wider angles. While the trend of bigger, better, brighter, and sharper screens offers a great benefit to the user, it also presents a drawback: the content of the screen may be more visible to prying eyes in the vicinity of the user. The proliferation of portable computers, tablet computers, as well as laptops and smart phones with larger screen—and their usage at public places, compromise privacy. For example, more and more corporate users use their portable computers for work of potentially sensitive nature—ordinarily conducted behind closed doors in an office—at public places such as coffee shops and airplanes, where their screens could be read by dozens of people at any given time.

SUMMARY

In some embodiments, the present disclosure provides a security system. The security system may include a memory, a hardware processor coupled to the memory, and a sensitivity determining module. The sensitivity determining module including instructions on said memory executable by the hardware processor for assigning a sensitivity value to a communication. The system may further include a parsing module including instructions on the module for execution by the hardware processor for parsing the communications into a sequence of fragments when the value of sensitivity assigned to the communication by the sensitivity-determining module exceeds a threshold sensitivity value, and indicates a sensitive message. The system may further include a transmission module for transmitting the communication of the sensitive message as the sequence of fragments.

In another aspect, the present disclosure provides a security method. The security method may include assigning a sensitivity value for a communication with a sensitivity-determining module including at least one hardware processor. Following assignment of the sensitivity value for the communication, the communication is formatted for display. In some embodiments, when the sensitivity value exceeds a threshold sensitivity value, the communication is parsed into a sequence of fragments. The communication may then be transmitted as the sequence of fragments when said sensitivity value exceeds the threshold sensitivity value.

In yet another aspect of the present disclosure, a computer program product is provided. The computer program product may include a non-transitory computer readable storage medium having computer readable program code embodied therein for performing a security method for transmitting a communication. The security method executed by the computer program product may include assigning a sensitivity value for a communication with a sensitivity determining module including at least one hardware processor. Following assignment of the sensitivity value for the communication, the communication is formatted for display. In some embodiments, when the sensitivity value exceeds a threshold sensitivity value, the communication is parsed into a sequence of fragments. The communication may then be transmitted as the sequence of fragments when said sensitivity value exceeds the threshold sensitivity level.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
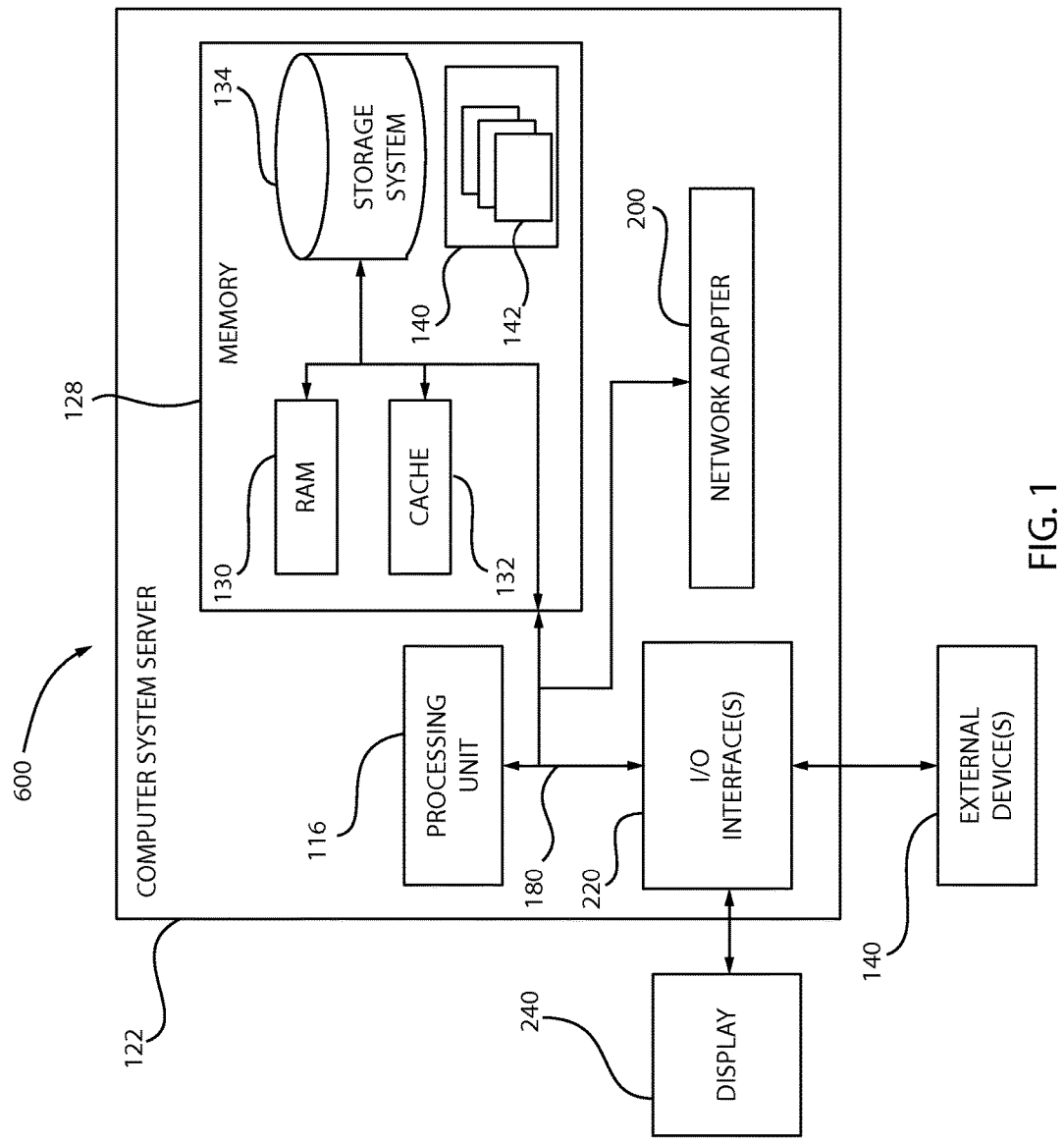
FIG. 1 depicts a cloud computing node according to an embodiment of the present disclosure.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 600 is only one example of a suitable cloud computing node, and is not intended to suggest any limitation as to the scope of use or functionality of embodiments of the present disclosure described herein. Regardless, cloud computing node 600 is capable of being implemented and/or performing any of the functionality set forth hereinabove.

In cloud computing node 600 there is a computer system/server 122, which is operational with numerous other general purpose or special purpose computing system environments or configurations. Examples of well-known computing systems, environments, and/or configurations that may be suitable for use with computer system/server 122 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 122 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 122 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 122 in cloud computing node 600 is shown in the form of a general-purpose computing device. The components of computer system/server 122 may include, but are not limited to, one or more processors or processing units 116, a system memory 128, and a bus 180 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 122 typically includes a variety of computer system readable media. Such media may be any available media that is accessible by computer system/server 122, and it includes both volatile and non-volatile media, removable and non-removable media.

System memory 128 can include computer system readable media in the form of volatile memory, such as random access memory (RAM) 130 and/or cache memory 132. Computer system/server 122 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the methods, systems and computer program products disclosure herein.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein. For example, the program modules 142 may carry out the functions and/or methodologies of the sensitivity determining module 10 for determining the sensitivity of a communication, parsing module 15 for parsing communications, and transmission module 20 for transmitting communications, which are described below with reference to FIGS. 4 and 5.

Computer system/server 122 may also communicate with one or more external devices 140 such as a keyboard, a pointing device, a display 240, etc.; one or more devices that enable a user to interact with computer system/server 122; and/or any devices (e.g., network card, modem, etc.) that enable computer system/server 122 to communicate with one or more other computing devices. Such communication can occur via Input/Output (I/O) interfaces 220. Still yet, computer system/server 122 can communicate with one or more networks such as a local area network (LAN), a general wide area network (WAN), and/or a public network (e.g., the Internet) via network adapter 200. As depicted, network adapter 200 communicates with the other components of computer system/server 122 via bus 180. It should be understood that although not shown, other hardware and/or software components could be used in conjunction with computer system/server 122. Examples, include, but are not limited to: microcode, device drivers, redundant processing units, external disk drive arrays, RAID systems, tape drives, and data archival storage systems, etc.

Figure 2:
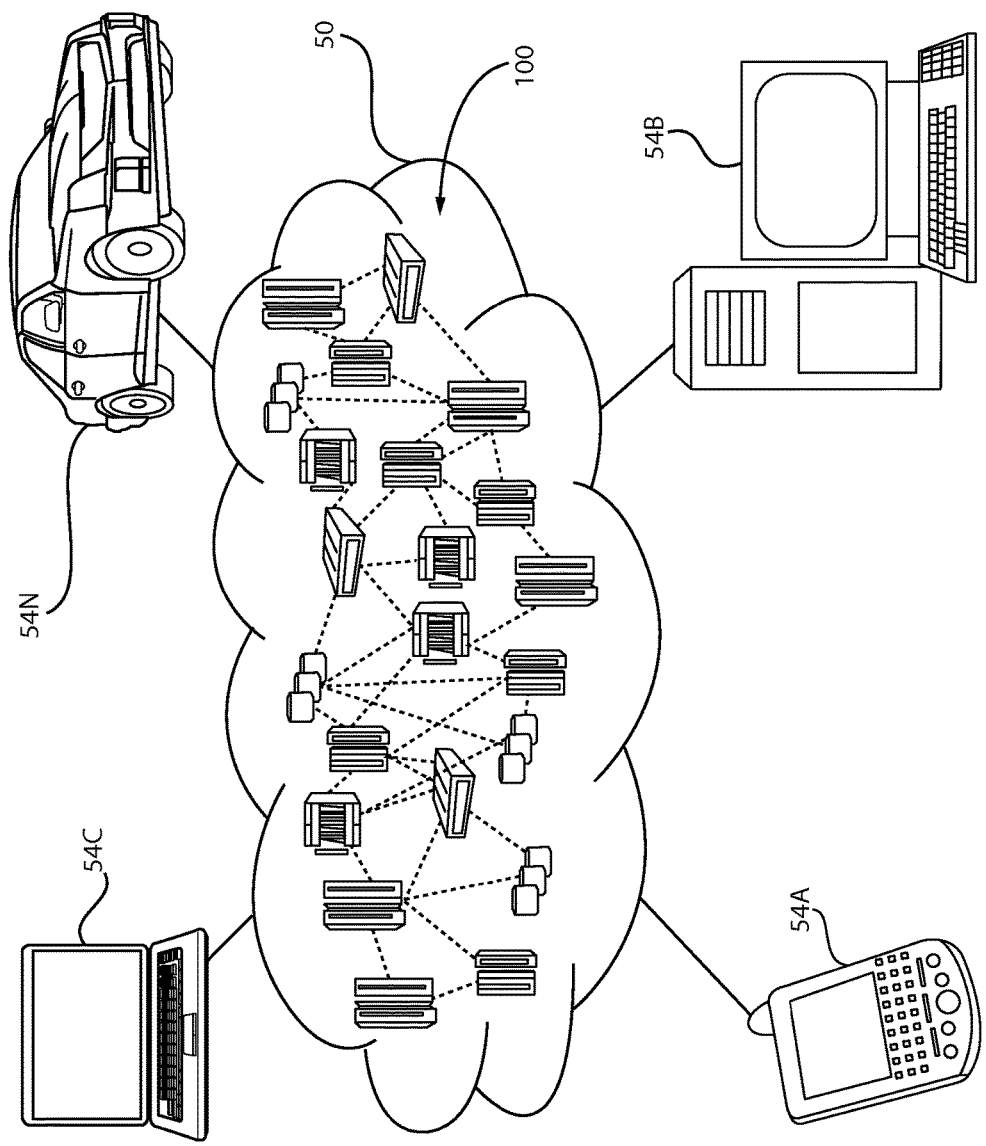
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. These devices may provide the displays 300 for sending and transmitting the communications in the security systems, methods and computer program products that are described below with reference to FIGS. 4-9.

Referring to FIG. 2, the nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 100 and cloud computing environment 50 can communicate with any type of computerized device over any type of network and/or network addressable connection (e.g., using a web browser).

Figure 3:
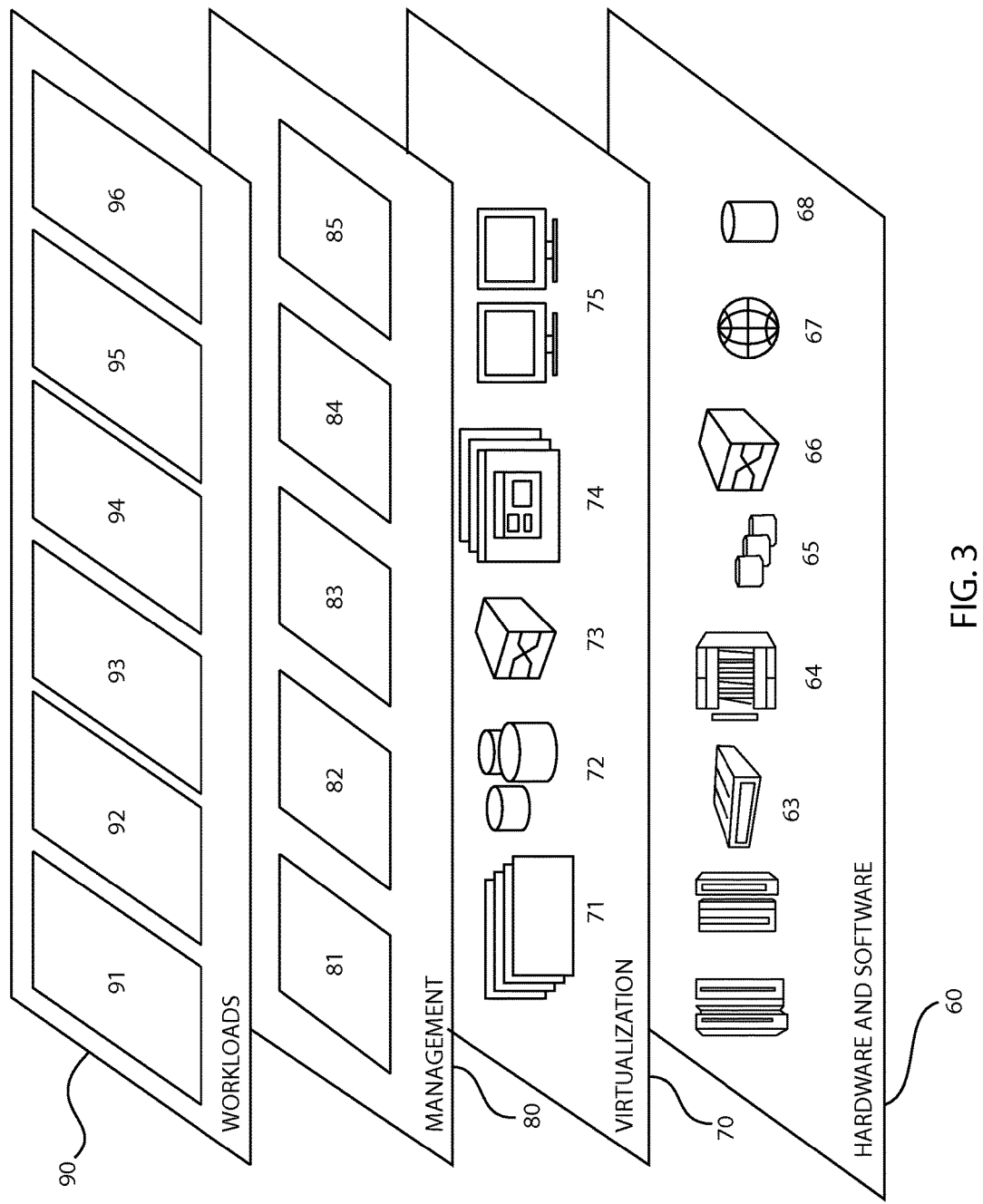
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the systems, methods and computer program are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure communication processing 96. The secure communication processing 96 provided by workload layer 90 may include functions and/or methodologies of the sensitivity determining module 10 for determining the sensitivity of a communication, parsing module 15 for parsing communications, and transmission module 20 for transmitting communications, which are described below with reference to FIGS. 4 and 5.

Referring to FIGS. 1-9, the methods, systems and computer program products disclosed herein provide enhanced display-screen security and privacy. Preventing 'screen captures' of sensitive material displayed on a screen, such as a computer screen, smartphone or other device including a screen, by unintended recipients of the sensitive subject matter is a big area of interest. In particular, the methods, systems and computer program products of the present disclosure include a sensitivity determining module 10 for determining the sensitivity of a communication, e.g., text and images, which are to be transmitted in a message to be viewed to the intended party to a communication exchange. For example, the sensitivity determining module 10 may designate a sensitivity value for highly sensitive material or may designate a sensitivity value for low sensitive material depending on the content of the text and images which are to be transmitted in the communication. The sensitivity value of the communication may be judges relative to a threshold sensitivity level. Based on the level of sensitivity assigned to the text and images by the sensitivity determining module 10, a parsing module for parsing sensitive communications 15 may section the text and images, wherein each parsed portion of the sensitive text and images when viewed individually does not transmit the sensitive subject matter to the viewer. But, when the parsed portions of the sensitive text and images when viewed in the appropriate parse sequence in substantially their entirety communicates the sensitive subject matter to the party receiving the sensitive communication.

The system may further include a transmission module 20 for transmitting the communication. The transmission module 20 transmits the communication without parsing to a second party when the parsing module 15 does not parse the communication. The transmission module 20 transmits the communication as the sequence of fragments to the second party when the parsing module for parsing has parsed the communication. As will be described in further detail below, transmission of the communication as the sequence of fragments parsed by the parsing module for the communication may be by a rapid serial visualization (RSV) presentation, e.g., Spritz presentation.

In this manner, the methods, systems, and computer products that are disclosed herein transmit communications in a way that makes it more difficult for an unintended recipient to casually view and comprehend the sensitive subject matter, e.g., sensitive text, from the display screen of an electronic device, e.g., desktop, laptop, smart phone, tablet, etc. For example, information that is sensitive may be considered confidential information and/or information that is proprietary in nature. Loss, misuse, modification, or unauthorized access to sensitive information can adversely affect the privacy or welfare of an individual, trade secrets of a business or even the security, internal and foreign affairs of a nation depending on the level of sensitivity and nature of the information. The concepts disclosed herein may also be useful to reduce copyright violations and to reduce the easy capture and posting of confidential information.

In some embodiments, the methods, systems and computer program products are applicable to any type of information that may be considered sensitive by the party transmitting of the communication. Sensitive material may include any marketing strategies, plans, financial information, or projections, operations, sales estimates, business plans and performance results relating to the past, present or future business activities of such party, its affiliates, subsidiaries and affiliated companies; (ii) plans for products or services, and customer or supplier lists; (iii) any scientific or technical information, invention, design, process, procedure, formula, improvement, technology or method; (iv) any concepts, reports, data, know-how, works-in-progress, designs, development tools, specifications, computer software, source code, object code, flow charts, databases, inventions, information and trade secrets; and any information that indicated as being sensitive by the party transmitting the information in a communication.

Figure 4:
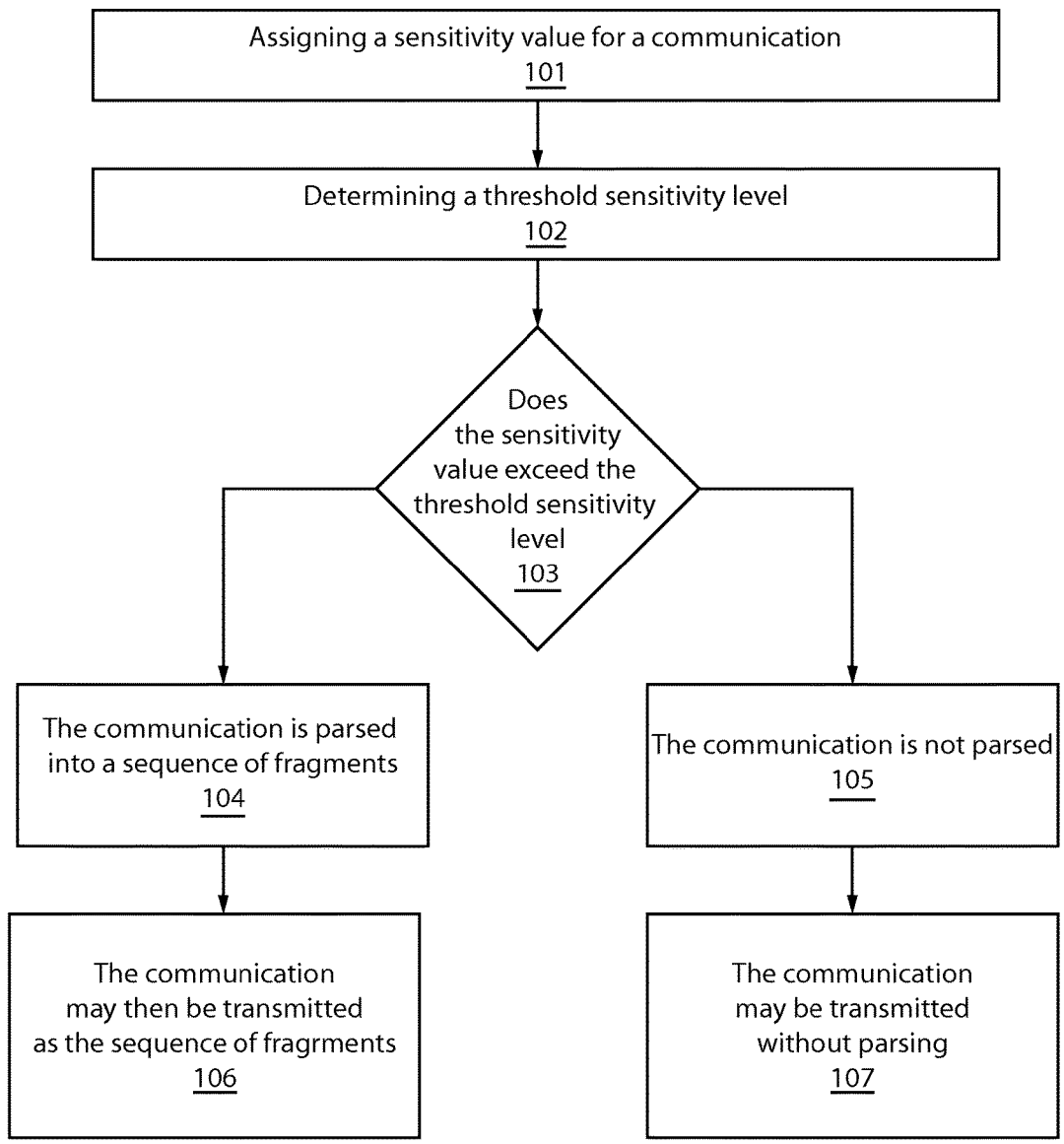
FIG. 4 is a block/flow diagram illustrating one embodiment of a security method, in accordance with the present disclosure.
Figure 5:
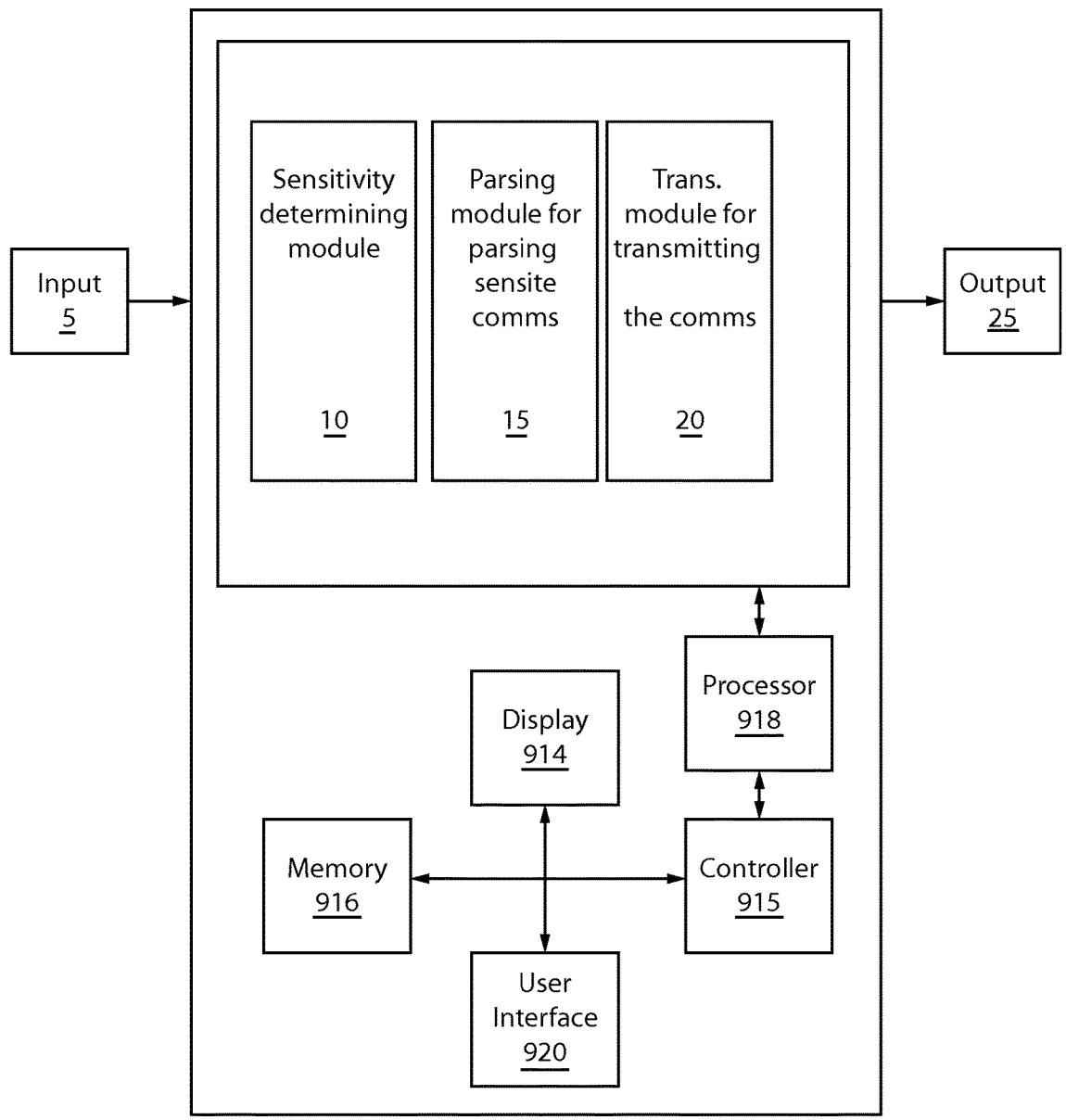
FIG. 5 is a block diagram of a security system that assigns a sensitivity value to communications, wherein when the sensitivity value the communication is parsed into a sequence of fragments to be transmitted to the party that the communication is intended for, in accordance with one embodiment of the present disclosure.

Referring to FIGS. 4 and 5, in some embodiments, the security method begins at step 101 with assigning a sensitivity value for a communication using the sensitivity determining module 10. FIG. 4 depicts a flow diagram depicting one embodiment of the security method disclosed herein. It is noted that the methods of the present disclosure are not limited to only the steps depicted in FIG. 4, as any number of preliminary steps and steps following the final steps depicted in FIG. 4 may also be included in the methods disclosed herein. Further, a number of intermediary steps may be practiced between each of the steps depicted in FIG. 4. FIG. 5 is a block diagram of a security system that assigns a sensitivity value to communications, wherein when the sensitivity value the communication is parsed into a sequence of fragments to be transmitted to the party that the communication is intended for.

The communication analyzed by the sensitivity determining module 10 may be text and images transmitted by one of electronic mail (email), real time electronic chats (e.g., instant messenger (AOL instant messenger/MSN instant messenger/blackberry messenger (BBM), and texts (e.g., texts sent and receive using cell phones/smart phones). The sensitivity value assigned to the communication being analyzed by the sensitivity determining module 10 may be based on text analysis of the communication, tags attached to the communication, and an indication supplied by the sender of the communication that it contains sensitive information, e.g., confidential and/or proprietary information.

Although the majority of the examples described herein refer to communications including text and images, the communications that are analyzed by the sensitivity determining module 10 may also be audio communications.

In some embodiments, text analysis as applied by the sensitivity determining module 10 to determine whether the communication includes sensitive material, e.g., confidential and/or proprietary information, involves information retrieval, lexical analysis to study word frequency distributions, pattern recognition, tagging/annotation, information extraction, data mining techniques including link and association analysis, visualization, and predictive analytics. For example, text analysis of a communication by the sensitivity determining module 10 may include searching for keywords, determining frequency of keywords, and sequences of keywords, in which the presence of the keywords can identify whether the communication is highly sensitive. In some embodiments, the sensitivity determining module determines the sensitivity of a communication by analyzing the presence of tags in the communication. A tag can be a keyword, e.g., non-hierarchical keyword, or term assigned to a piece of information. For example, and email communication can be tagged as being confidential or proprietary, which would indicate that the document is highly sensitive. Tags can be a form of metadata that can help describe the sensitivity of communication. Tags are generally chosen by the communications creator/author. For example, the users can tag different areas of text that are more sensitive or not. In the given context, type of content, URL, and the device where content of the communication to be analyzed is rendered, etc., may all be forms of information that can be tagged into a communication. Depending on the message provided by the tag, the communication can be sensitive or not sensitive.

In some embodiments, social networks can be further used through active learning to improve the evaluation of sensitivity and computation of the sensitivity level of the communication by the sensitivity determining module 10. The proposal may be to use the social network analysis by the system to allow the system to interact with one or more users as a point of contact into a deeper social network where more accurate information may lie.

In some embodiments, the decision that a communication is sensitive may be trigged by the actions of an unintended viewer to intercept the communication, e.g., by attempting to take a screen capture. Sensors incorporated into the device for receiving the communication may detect the presence of the unintended viewer attempting to intercept the communication, which in turn can send a signal to the sensitivity determining module 10 to designate the communication as being sensitive.

Still referring to FIGS. 4 and 5, the sensitivity determining module 10 may assign a sensitive level to the communication that is being analyzed, and then compare the sensitivity level to a threshold sensitivity level at step 102 of the process flow depicted in FIG. 5. For example, the sensitivity determining module may assign a level of A or level B to text or images or audio that are not considered to be sensitive, while the sensitivity determining module may assign a level of C to text or images or audio that are considered to be sensitive. The determination of level C value of sensitivity may be based on whether the communication includes terms, i.e., keywords, that have been designated as indicative of confidential and/or proprietary information, or whether the author of the communication has tagged the communication as being confidential and/or proprietary.

Following assignment of the sensitivity value for the communication, the communication is formatted for display. Formatting of the communication for display can be the function of the parsing module for parsing the sensitive communication 15. At step 103 of the process flow depicted in FIG. 5, formatting of the communication for the display may begin with a decision of whether the sensitivity value assigned by the sensitivity determining module 10 exceeds the threshold sensitivity level.

Depending upon whether the sensitivity value exceeds the threshold sensitivity value, the parsing module for parsing the sensitive communication 15 will parse the communication. As used herein, the term "parse" as used to describe the formatting of the communication includes sectioning the communication into portions. For example, a textual message that has a sensitivity level greater than the threshold sensitivity level may be parsed into individual words of that communication, which are to be communicated to the intended receiver in their sequence as provided by the sequence of words in the communication. In some embodiments, it is not required that the communication be parsed into single words in a textual communication, e.g., the communication may be parsed into groups of words that are less than a full sentence, full sentences and/or paragraphs from the communication. For example, when the communication is being parsed into group may range from 2 words to 5 words. This is one example of words in a parsed group from a full communication that has been identified as having a sensitivity level exceeding the threshold sensitivity level. In other example, the number of words in a parsed group may be equal to 2, 3, 4, 5, 6, 7, 8, 9, 10, 11, 12, 13, 14, 15, 16, 17, 18, 19 and 20, or any range for the number of words in a group with a lower limit and upper limit provided by the above examples. Similar to the embodiments in which the communication is parsed into single words, in the embodiments in which the communication is parsed into groups of words that are less than a full sentence, full sentences and/or paragraphs from the communication, the parsed portions of the communication may be communicated to the intended receiver in their sequence as provided by the sequence in the communication.

In the embodiments, in which the communication includes an image, the image may be sectioned into portions by the parsing module for parsing the sensitive communication 15. For example, the image may be sectioned into parsed portions according to a grid. In some examples, at the time of display, each of the parsed portions may then be displayed to the intended receiver in a sequence consistent with the grid, e.g., each parsed portion of the image can be displayed individually from left to right on the screen, or up and down on the screen.

In some other embodiments, in which the communication includes audio, the parsing module for parsing the sensitive communication 15 may first convert the audio communication into a textual communication. Following conversion to the textual communication, the textual communication may be parsed into sections for display. Similar to the embodiments in which text communication are parsed, in the embodiments in which the audio communication is converted into text, the text may be parsed into parsed portions which can comprise of a single word, multiple words in less than a sentence, sentences, and paragraphs. The parsed portions of the text may be communicated to the intended receiver in their sequence, as provided by the original sequence in the audio communication.

In yet some other embodiments, a text communication may be converted from text to audio. The audio may then be communicated to the intended receiver without the text display for the message. In the embodiments in which the text communication is converted to audio, security may be provided by listening to the audio using headphones, as opposed to visually viewing text.

In yet another embodiment, the text communication may be parsed so that the order of the letters in each word of the communication are changed except for the first and last letter of each word.

The degree of parsing may be dependent upon the degree of sensitivity of the communication. For example, as noted above, the sensitivity determining module 10 may designate varying degrees of sensitivity that would requiring parsing or conversion of the communication from one form of medium, e.g., text, to another form of medium, e.g., audio. For example, in the embodiments in which a sensitivity level of A or B does not require that the communication be parsed, and a sensitivity level of C does require that the communication be parsed, other sensitivity levels may indicate a greater degree of parsing, e.g., sensitivity levels D, E, F, and G. For example, a sensitivity level of C may require that a textual message be parsed into paragraphs; a sensitivity level of D may require that a textual message be parsed into sentences; a sensitivity level of E may require that a textual message be parsed into three word terms; a sensitivity level of F may require that a textual message be parsed into single words; and a sensitivity level of G may require that the textual message be converted to audio for listening by the intended user with headphones.

In the examples, in which the message is parsed into single words, the higher the sensitivity level, the faster the sequence of words that are being depicted on an electronic display screen for viewing by the intended recipient, e.g., the sequence of words may be displayed at a rate of 200 words per minute to 1000 words per minute dependent upon the sensitivity of the communication.

Referring back to FIG. 4, in some embodiments, when the sensitivity value exceeds the threshold sensitivity level, the communication is parsed into a sequence of fragments at step 104. In some embodiments, when the sensitivity value does not exceed the security threshold the communication is not parsed by the parsing module 15 at step 105.

Figure 6:
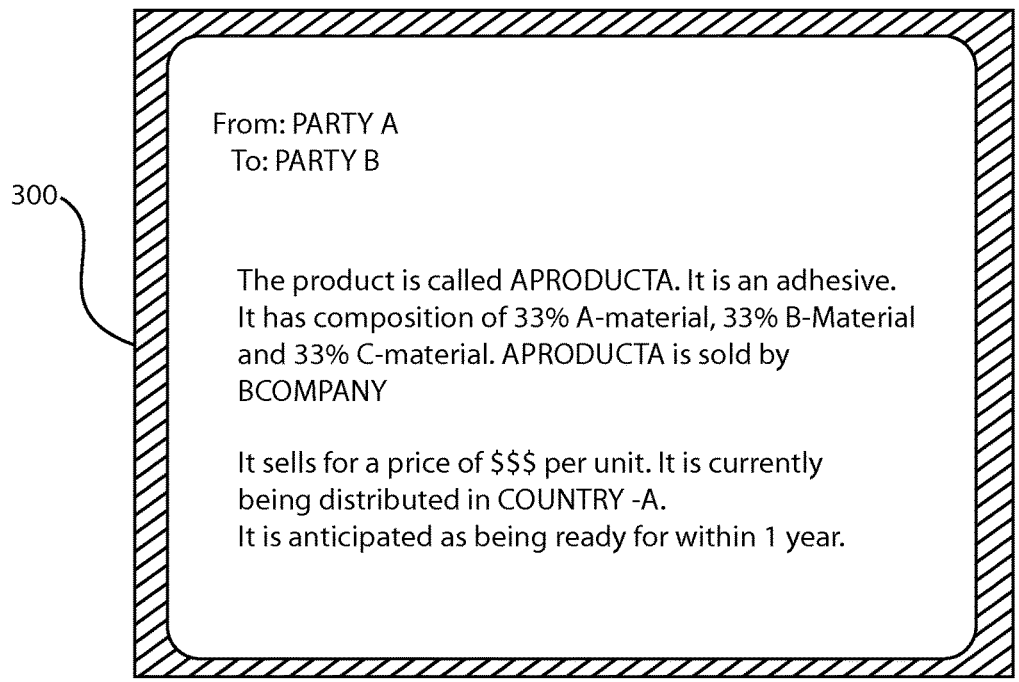
FIG. 6 is a pictorial view of an electronic display screen depicting a communication as authored from the sender of the communication without parsing, in accordance with one embodiment of the present disclosure.

Referring to FIGS. 4 and 5, the communication may then be transmitted to the intended party for receiving the communication by the transmission module for transmitting the communication 20. Referring to FIG. 4, when the communication has not been parsed, i.e., when the sensitivity of the communication does not exceed the sensitivity threshold, the transmission module 20 transmits the communication in its original format at step 107. For example, when the communication is not sensitive, and if the communication is in the form of a textual email, the email is transmitted by the transmission module 20 to the display screen 300 of the intended party for receiving the communication, wherein the communication is not parsed so that the entirety of the message is simultaneously displayed on the display screen 300 at the same time, as depicted in FIG. 6.

Referring to FIGS. 4 and 5, when the sensitivity value set by the sensitivity determining module 10 exceeds the security threshold, and the parsing module 15 has parsed the sensitive message into a sequence of fragments, the transmission module 20 transmits the communication as the sequence of fragments to the intended receiving party at step 106 of the method depicted in FIG. 4. The fragments are depicted on the electronic display, i.e., display screen 300, in accordance with the parsing provided by the parsing module 14 and the sensitivity determining module 10.

In one embodiment, when the parsing module 15 parses the communication into separate paragraphs, the transmission module 20 may display each paragraph individually on the display screen 300 in sequence. The time that each paragraph may be present on the display screen prior to sequencing to the following paragraph may be dependent upon the sensitivity value set by the sensitivity determining module 10.

FIGS. 7A-8G depicts examples of parsed sensitive communications being transmitted by the transmission module 20 to the display screen 300 of the intended receiver of the communication. The display screen 300 may be the screen of a terminal, desktop computer, laptop computer, tablet, phone, or combination thereof. The aforementioned examples of display screens 300 are intended to be illustrative, and are not intended to limit the present disclosure. For example, any device for receiving a communication including a display screen is suitable for use with the systems, methods and computer program products that are disclosed herein.

FIGS. 7A-7D depict another embodiment of the present disclosure, in which the parsing module 15 have parsed the sensitive communication into separate sentences. More specifically, FIGS. 7A-7D depict transmission of the first paragraph of the communication depicted in FIG. 6.

Figure 7A:
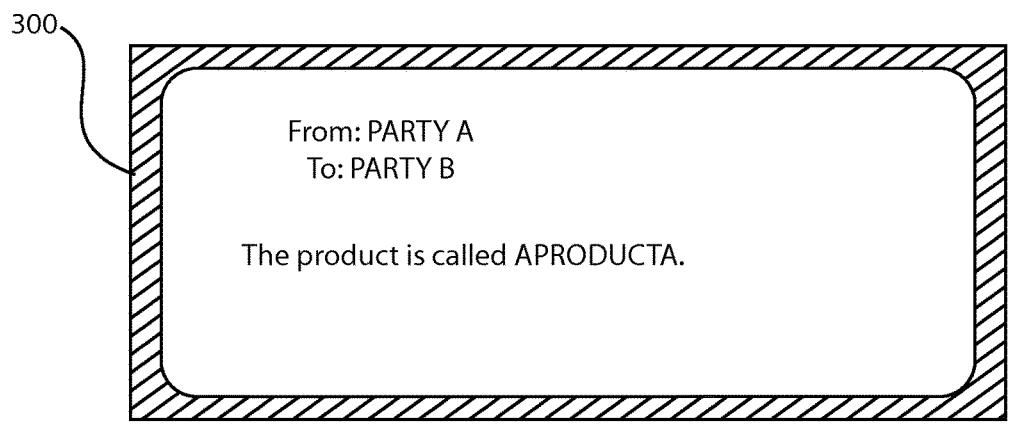
FIGS. 7A-7D are pictorial views depicting the first paragraph of the communication depicted in FIG. 6 being parsed into individual sentences and depicted on an electronic display screen one parsed sentence on the screen at a time in a sequence consistent with the sequence of sentences depicted in the communication depicted in FIG. 6, in accordance with the present disclosure.
Figure 7B:
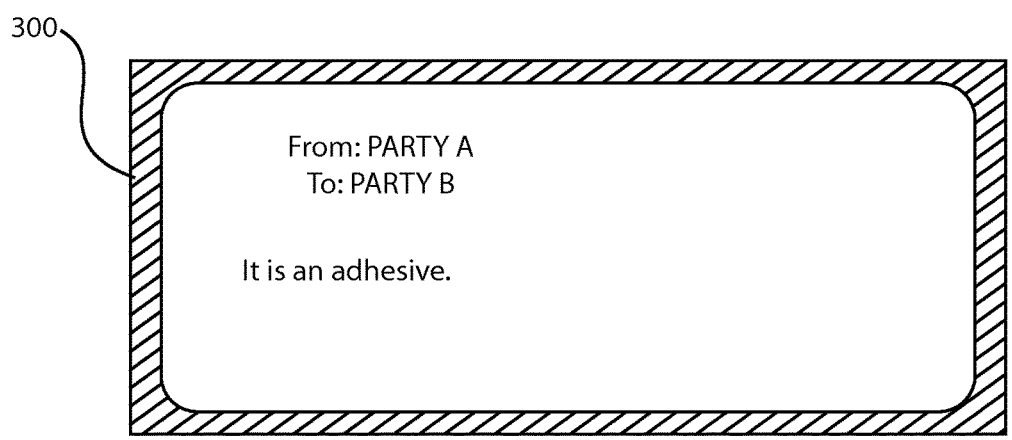
Figure 7C:
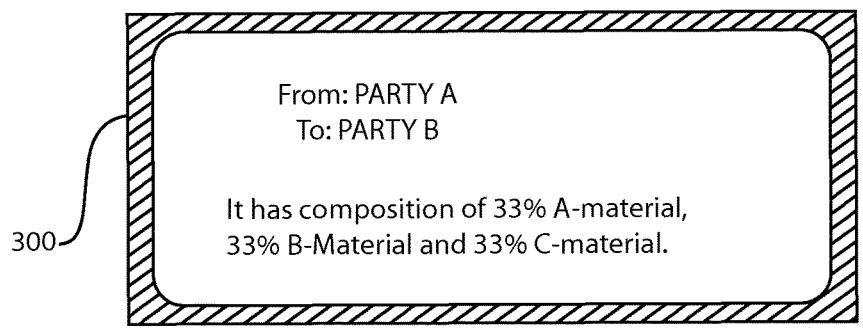
Figure 7D:
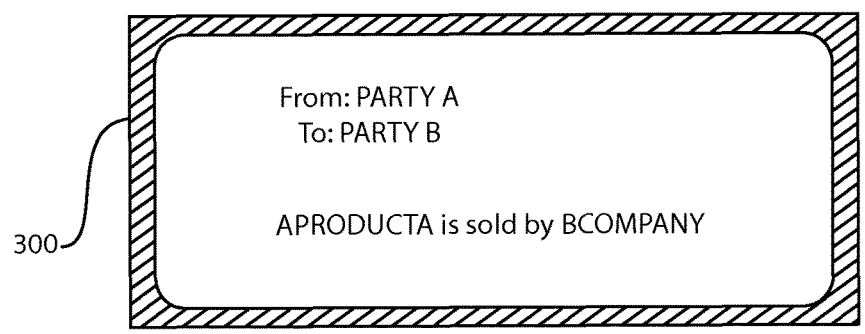

FIG. 7A depicts transmission of the first sentence of the first paragraph depicted in FIG. 6 on the display screen 300 of the intended receiver for the communication. In this example, the first sentence of the communication is the only portion of the communication that is depicted at the time the first sentence of the communication is transmitted. FIG. 7B depicts transmission of the second sentence of the first paragraph depicted in FIG. 6 on the display screen 300 of the intended receiver for the communication. During the transmission of the second sentence of the first paragraph, the first sentence of the first paragraph of the first paragraph has been removed from the display screen 300. In this example, the second sentence of the communication is the only portion of the communication that is depicted at the time the second sentence of the communication is transmitted. FIG. 7C depicts transmission of the third sentence of the first paragraph depicted in FIG. 6 on the display screen 300 of the intended receiver for the communication. During the transmission of the third sentence of the first paragraph, the second sentence of the first paragraph of the first paragraph has been removed from the display screen 300, and the third sentence of the communication is the only portion of the communication that is depicted at the time the third sentence of the communication is transmitted by the transmission module 20. FIG. 7D depicts transmission of the fourth sentence of the first paragraph depicted in FIG. 6 on the display screen 300 of the intended receiver for the communication. During the transmission of the fourth sentence of the first paragraph, the third sentence of the first paragraph of the first paragraph has been removed from the display screen 300, and the fourth sentence of the communication is the only portion of the communication that is depicted at the time the fourth sentence of the communication is transmitted by the transmission module 20.

FIGS. 7A-7D depict only the transmission of the first paragraph of the communication. In some embodiments, the transmission of the communication may continue with the transmission of the second paragraph, wherein the second paragraph has been parsed into sentences, and each parse sentence may be transmitted by the transmission module 30 individually on the display screen 300 of the intended receiver for the communication, similar to the above describe mode of transmission of the parsed sentences for the first paragraph of the communication.

The speed of display and sequencing of the parsed sentences may be dependent upon the sensitivity level set by the sensitivity determining module 20. For example, the sentences may be transmitted at a rate of 10 sentences per minute to 30 sentences per minute.

FIGS. 8A-8G depict another embodiment of the present disclosure, in which the parsing module 15 have parsed the sensitive communication into separate words. More specifically, FIGS. 8A-8G depict transmission of the first sentence of the communication depicted in FIG. 6, wherein the first sentence has been parsed into individual words.

Figure 8A:
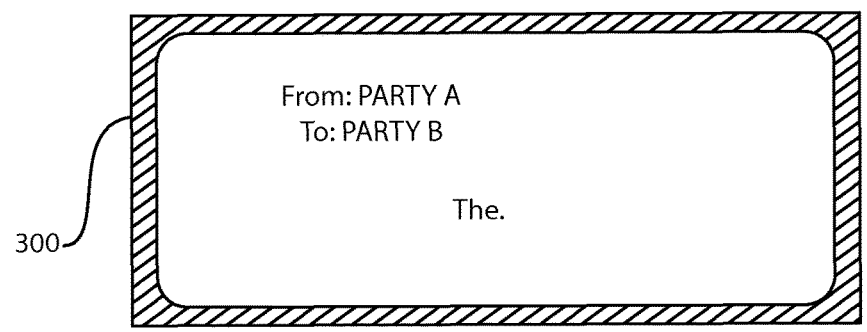
FIGS. 8A-8G are pictorial views depicting the first sentence of the first paragraph of the communication depicted in FIG. 6 being parsed into individual words and depicted on an electronic display screen one parsed word on the screen at a time in a sequence consistent with the sequence of words depicted in the communication depicted in FIG. 6, in accordance with the present disclosure.
Figure 8B:
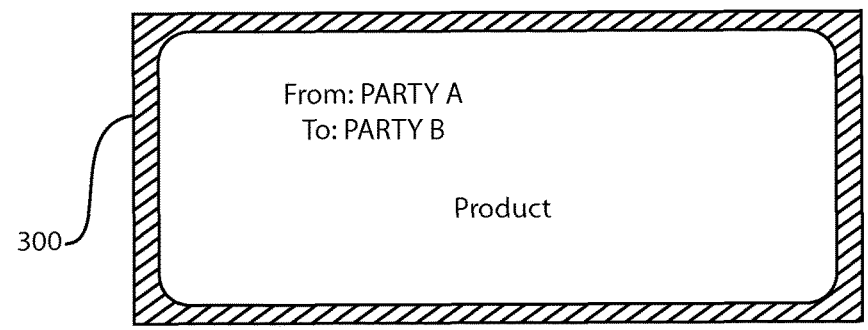
Figure 8C:
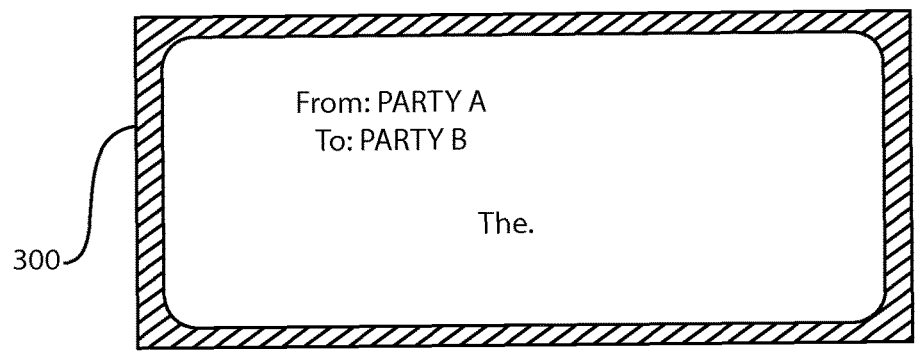
Figure 8D:
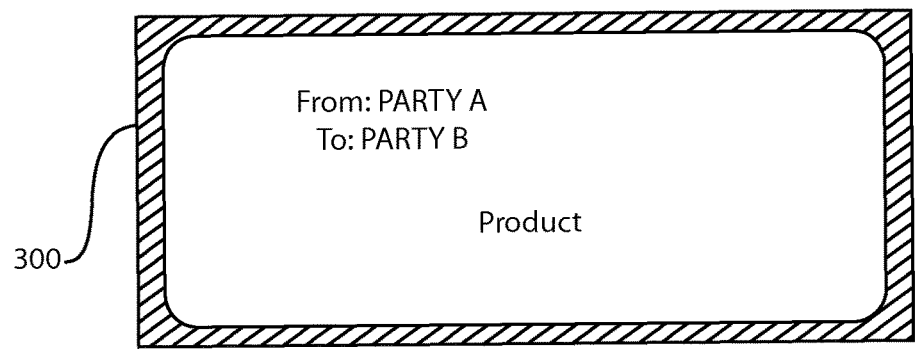
Figure 8E:
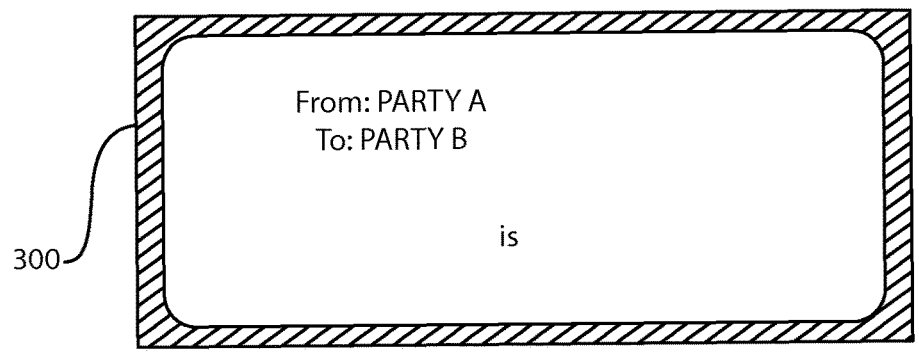
Figure 8F:
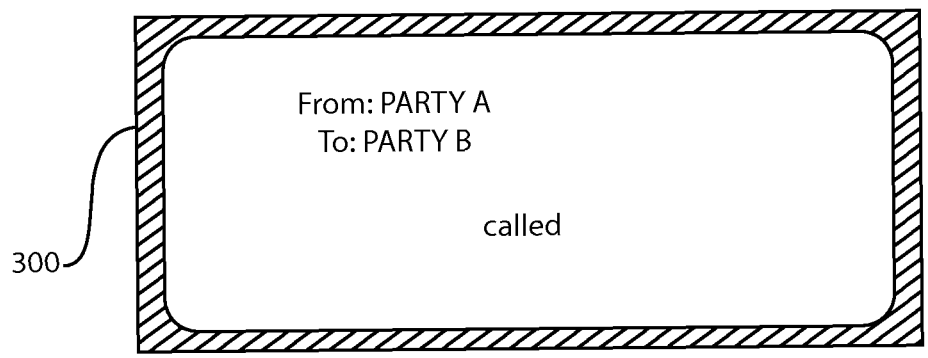
Figure 8G:
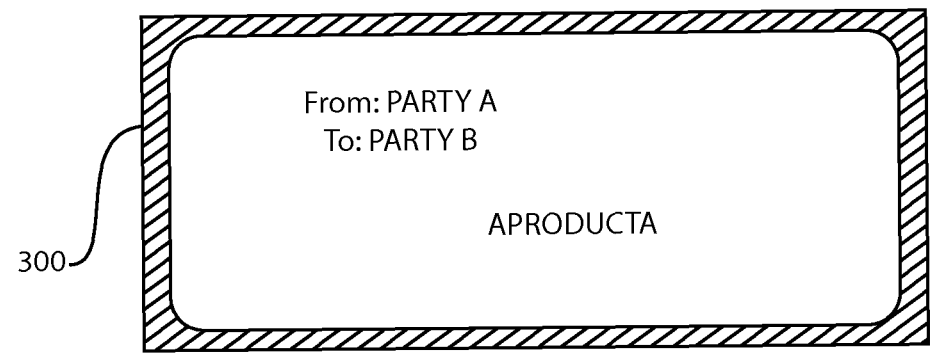
Figure 9:
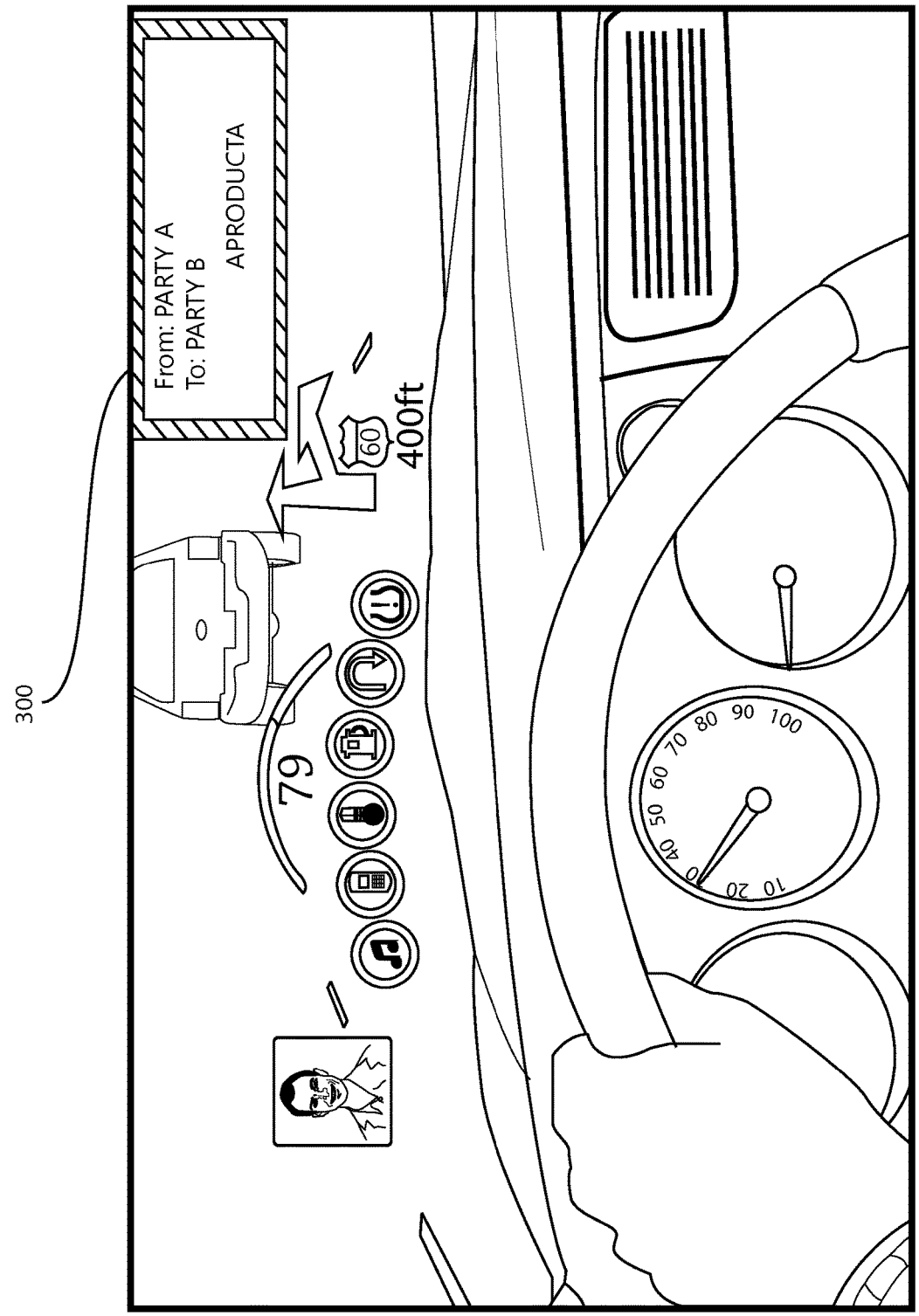
FIG. 9 is a pictorial view of a heads up display of a motor vehicle including a rapid serial visualization display (RSVP) box, in accordance with one embodiment of the present disclosure.

FIG. 8A depicts transmission of the first word of the first sentence depicted in FIG. 6 on the display screen 300 of the intended receiver for the communication. In this example, the first word of the communication is the only portion of the communication that is depicted at the time the first word of the communication is transmitted. FIG. 8B depicts transmission of the second word of the first sentence depicted in FIG. 6 on the display screen 300 of the intended receiver for the communication. During the transmission of the second word of the first sentence, the first word of the first sentence of the communication has been removed from the display screen 300. In this example, the second word of the communication is the only portion of the communication that is depicted at the time the second word of the communication is transmitted. FIG. 8C depicts transmission of the third word of the first sentence depicted in FIG. 6 on the display screen 300 of the intended receiver for the communication. During the transmission of the third word of the first sentence, the second word of the first sentence of the first paragraph has been removed from the display screen 300, and the third word of the communication is the only portion of the communication that is depicted at the time the third word of the communication is transmitted by the transmission module 20. FIG. 8D depicts transmission of the fourth word of the first sentence depicted in FIG. 6 on the display screen 300 of the intended receiver for the communication. During the transmission of the fourth word of the first sentence, the third word of the first sentence of the first sentence has been removed from the display screen 300, and the fourth word of the communication is the only portion of the communication that is being transmitted to the display screen. FIG. 8G depicts transmission of the final word of the first sentence depicted in FIG. 6.

FIGS. 8A-8G depict only the transmission of the first sentence of the communication. In some embodiments, the transmission of the communication may continue with the transmission of the remainder of sentences in the first paragraph, as well as sentences in the second paragraph, wherein each of the sentences have been parsed into words. Each parsed word may be transmitted by the transmission module 30 individually on the display screen 300 of the intended receiver for the communication.

The speed of display and sequencing of the parsed words may be dependent upon the sensitivity level set by the sensitivity determining module 20. For example, the parsed words may be displayed at a rate of 100 words per minute to 1000 words per minute. In one examples, the parsed words may be displayed at a rate of 200 to 700 words per minute.

In other embodiments, when the communication is a sensitive image that has been parsed, the transmission module 20 may display each of the parsed sections of the image in the sensitive communication in a sequence consistent with the grid by which the image was sectioned, i.e., parsed. For example, each parsed portion of the image can be displayed individually from left to right on the display screen, or up and down on the display screen, in accordance with the mode of transmission set by the transmission module 20. In the embodiments, in which the sensitive image has been converted to text, the text may be displayed to the intended receiver in a manner similar to the way the text has been described as being described above.

In yet further embodiments, the sensitivity level of the communication set by the sensitivity determining module 10 may be so high that the text is converted to audio. In this example, the transmission module 20 does not transmit text to the display screen 300 of the intended receiver of the communication. Instead, the transmission module transmits the communication as audio, which is to be received by the intended receiver through a pair of headphones. In some examples, the transmission module 20 may also send a textual message to be displayed on the display 300 indicating to the intended receiver that the communication is sensitive, and has been converted to audio to be listened to through a set of earphones to avoid that unintended parties can have the opportunity to listen in to the communication.

In some examples, the sensitivity determining module 10, the parsing module 15, and the transmission module 20 provide for an automatic conversion of 'sensitive information' in a communication to a rapid serial visualization (RSV) presentation, which may also be referred to as a Spritz reading presentation. The rapid serial visualization (RSV) reader is a simple, small box that streams text at the reader, one word at a time. In this manner, it is much more difficult to capture the information, although it is fairly easy for a recipient to read such information. Spritz that is available from Spritz Inc. is only one example of a rapid serial visualization (RSV) presentation, and the present disclosure is not limited to only this example. There have been many rapid serial visualization (RSV) presentation schemes developed, such as those executable on Android and Apple platforms, which may be available under the titles A Faster Reader, Balto Speed Reading, RapidRead, SpeedBookReader, Speed Reader Spritzer, Speed Reacing, Speedy-Speed Reading; Spree, and Velocity. Any rapid serial visualization (RSV) presentation is suitable for use with the present disclosure, and may typically include Optimal Recognition Point and/or Optimal Viewing Position (OVP) schemes to aid the viewer in recognizing the meaning of the messages being transmitted.

In particular, in one example, the a system and methods disclosed herein provide a display screen 300; a computation of the sensitivity with confidence level (sensitivity level), e.g., sensitivity determining module 10; a method for converting the communication to a Spritz presentation, e.g., parsing module 15; and based on the sensitivity value assigned by the sensitivity determining module 5, a method for triggering and displaying text (textual representation of images) with the rapid serial visualization (RSV) presentation. This method and system can make it more difficult for someone to casually capture sensitive text from a display screen, and to print, view, and disseminate such information. This may also be useful to reduce copyright violations and to reduce the easy capture and posting of confidential information.

In some examples, the rapid serial visualization (RSV) containing method may begin with determining that transmitted content is "sensitive" content, e.g., with sensitivity level C or greater, as described above. For example, email, chat, or instant messages may be determined to be sensitive based on tagging by the sender, or on an automated determination. If the sensitivity level is greater than a threshold sensitivity level, e.g., the sensitivity level of the communication is determined to be a level C or greater, the communication is converted to a rapid serial visualization (RSV) presentation format, e.g., by the parsing module 15, and the system automatically triggers, e.g., with the transmission module 20, the rapid serial visualization (RSV) transmission on the display 300. For example, the rapid serial visualization (RSV)/spritz system may flash words to the intended receiver in quick succession so that the intended receiver of the communication does not have to move their eyes around on a screen to comprehend the message. A rapid serial visualization (RSV) presentation is similar to the sequence of words described above with reference to FIGS. 8A-8G. This type of presentation can make is more arduous for an unintended receiver of the communication to capture the communication in a convenient way and transmit to additional third parties that are not intended receivers of the communication. When sensitivity level is less than a threshold sensitivity level, e.g., the sensitivity level of the communication is determined to be a level of A or B, i.e., less than level C, the rapid serial visualization (RSV) presentation mode may be un-triggered. Additionally, and optionally, if the sensitivity level of the communication to be transmitted is much greater than the threshold sensitivity value, the text and images may be converted to audio and conveyed via headphones, earphones, etc., thus making it hard for an unintended third party recipient to capture sensitive information from a screen.

In yet other examples, an audio communication/broadcast may be monitored. Audio may be converted to text and analyzed for sensitive content by the aforementioned sensitivity determining module 10. If the sensitivity level assigned to the audio/broadcast is greater than the threshold value, e.g., the sensitivity level is assigned to be level C or greater, an integrate rapid serial visualization (RSV) display may be activated to display audio to text in rapid serial visualization (RSV) format. The audio is then muted.

In accordance with some objectives of the present disclosure, the system, method and computer products disclosed herein provide for automatically toggling to a rapid serial visualization (RSV)/Spritz format of communication when sensitive (e.g. confidential, embarrassing, copyrighted content) is transmitted.

Automatically converting from a traditional reader to a Spritz/Rapid Serial Visual Presentation (RSVP) reader is interesting, especially as it pertains to security and privacy. The detection of a security risk may be triggered in interesting ways, in addition to the aforementioned approaches such as the use of tags and text analytics. For example, the triggering of the transition to the RSVP may be: 1) due to a user attempting to take a screen capture, or 2) due to someone reading over the shoulder of a for-your-eyes-only recipient. Also, the system may sense the ambient viewing environment to determine that it is likely that a second reader, i.e., unintended recipient for the communication, may be present. In other embodiments, the reason converting to Rapid Serial Visual Presentation (RSVP) may be a block of text can be read by many readers simultaneously, where each reader may be on a different word in the text at any given moment. In some embodiments, Rapid Serial Visual Presentation (RSVP) requires that all readers be on the same word, and so will afford the user of Rapid Serial Visual Presentation (RSVP) some inherent privacy, since another reader may not get the "gist" of the text if they start at this point.

In some embodiments, the systems described herein may apply to location-based services in which the user's location is used to determine when it is likely to be useful to atomically switch a messaging modality to the Rapid Serial Visual Presentation (RSVP) for privacy or security. The methods, systems and computer products described herein may apply to various domains in which privacy is useful, including when discussing medical concerns. This invention is generally applicable to privacy, security, and communications among people—and communications from machines to people.

We also note that the Rapid Serial Visual Presentation (RSVP) may be used in an audio broadcast/communication context. Consider an audio interface within a car to a radio broadcast, satellite radio broadcast, or other broadcast, or a communication over a cellular phone broadcast into the car. At certain times in the broadcast, the sensitivity module 10 of the system, which may be incorporated into the receiver of the communication, detects that the broadcast has become sensitive. A dashboard display integrated in the driver's field of view then displays Rapid Serial Visual Presentation (RSVP) of the broadcast speech to text, and the audio is muted. The display 300 may be integrated into a heads up display of a motor vehicle. In addition, we disclose that Spritz/RSVP text may be sized according to the volume of the broadcast/speech, such that a reader of the RSVP/Spritz may be aware of such emphasis despite the broadcast being muted. This could be useful when a phone conversation, radio news-story, or radio-host dialog contains content that may not be suitable for all family members in a car.

Referring to FIG. 5, a security system 500 is provided that includes sensitivity determining module 10, a parsing module for parsing sensitive communications 15, and a transmission module 20 for transmitting the communication. The sensitivity determining module 10 includes at least one hardware processor for determining the sensitivity of a communication received from a first party, wherein the sensitivity determining module 10 assigns a sensitivity value for the communication. The parsing module 15 is for parsing sensitive communications when the value of sensitivity assigned to the communication by the sensitivity determining module 10 indicates a sensitive communication. In some embodiments, when the value of the sensitivity assigned to the communication by the sensitivity determining module indicates a non-sensitive message, the module for parsing the sensitive communication 15 does not parse the communication. When the parsing module 15 does not parse the communication, the transmission module 20 transmits the communication without parsing to a second party. When the parsing module for parsing the sensitive communication 10 has parsed the sensitive message into said sequence of fragments, the transmission module 20 transmits the communication as the sequence of fragments to the second party.

In one embodiment, the system 500 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 500 may include one or more displays 914 for viewing the functionality of the modules 10, 15, 20 of the system 500. The displays 914 may permit a user to interact with the system 500 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 500 may receive input data 5 which may be employed as input of the communication to be analyzed for sensitivity, formatted, and transmitted by the plurality of modules 10, 15, 20 that provide the security system of the present disclosure. The system 500 may produce output data 25, which in the formatted communication to be transmitted, e.g., parsed or non-parsed communication, to the display 300 of an intended recipient of the communication. It should be noted that while the above configuration is illustratively depicted, it is contemplated that other sorts of configurations may also be employed according to the present principles. Further details regarding the functionality of the sensitivity determining module 10, the parsing module for parsing sensitive communications 15, and the transmission module 20 for transmitting the communication for have been provided above with reference to FIGS. 4-8G.

Having described some embodiments of the system, method and computer program product of the present disclosure, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A security method comprising:
assigning a sensitivity value for text in a communication with a sensitivity determining module including at least one hardware processor, wherein when the communication contains a tag that indicates the communication is sensitive, the sensitivity value is greater than a threshold sensitivity level, and when the communication contains a tag that indicates the communication is not sensitive, the sensitivity value is less than the threshold sensitivity level;
formatting said communication for display, wherein when said sensitivity value of said exceeds the threshold sensitivity level, the communication is parsed into a sequence of text fragments, and when the sensitivity value does not exceed the threshold sensitivity level the communication is not parsed; and
transmitting the communication as the sequence of text fragments as a rapid serial visualization (RSV) presentation when said sensitivity value exceeds the threshold sensitivity level or transmitting the communication without being parsed when said sensitivity value does not exceed the threshold sensitivity level.

2. The method of claim 1, wherein the sequence of fragments includes changing an order of letters in each word of the communication except for a first and last letter of the word.

3. The method of claim 1, where the sensitivity value for the communication set by the sensitivity determining module dictates in said sequence of fragments for the communication characteristics selected from the group consisting of speed of presentation of each fragment in said sequence on said display, number of words in said fragment on the display at the same time, number of images viewable on the display at the same time, and converting an image to fragments of textual description.

* * * * *